(12) United States Patent
Bondalapati et al.

(10) Patent No.: US 9,244,705 B1
(45) Date of Patent: Jan. 26, 2016

(54) INTELLIGENT MICRO-VIRTUAL MACHINE SCHEDULING

(75) Inventors: Kiran Bondalapati, Los Altos, CA (US); Gaurav Banga, Cupertino, CA (US); Vikram Kapoor, Cupertino, CA (US); Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 98 days.

(21) Appl. No.: 13/527,542

(22) Filed: Jun. 19, 2012

Related U.S. Application Data

(63) Continuation-in-part of application No. 13/115,354, filed on May 25, 2011, and a continuation-in-part of application No. 13/223,091, filed on Aug. 31, 2011.

(60) Provisional application No. 61/349,717, filed on May 28, 2010.

(51) Int. Cl.
*G06F 9/46* (2006.01)
*G06F 9/455* (2006.01)

(52) U.S. Cl.
CPC .................................. *G06F 9/45504* (2013.01)

(58) Field of Classification Search
None
See application file for complete search history.

(56) References Cited

U.S. PATENT DOCUMENTS

| 7,191,440 | B2 * | 3/2007 | Cota-Robles et al. | 718/1 |
|---|---|---|---|---|
| 7,506,265 | B1 * | 3/2009 | Traut et al. | 715/763 |
| 8,141,075 | B1 * | 3/2012 | Chawla et al. | 718/1 |
| 2007/0136372 | A1 * | 6/2007 | Proctor et al. | 707/104.1 |
| 2007/0250833 | A1 * | 10/2007 | Araujo et al. | 718/1 |
| 2007/0260702 | A1 | 11/2007 | Richardson et al. | |
| 2009/0217072 | A1 | 8/2009 | Gebhart et al. | |
| 2011/0023028 | A1 * | 1/2011 | Nandagopal et al. | 718/1 |
| 2011/0167421 | A1 | 7/2011 | Soundararajan et al. | |
| 2012/0089980 | A1 * | 4/2012 | Sharp et al. | 718/1 |
| 2012/0297383 | A1 * | 11/2012 | Meisner et al. | 718/1 |
| 2013/0283266 | A1 * | 10/2013 | Baset et al. | 718/1 |

* cited by examiner

*Primary Examiner* — Diem Cao
(74) *Attorney, Agent, or Firm* — Brokaw Patent Law PC; Christopher J. Brokaw

(57) ABSTRACT

Programmatically adjusting the operational state of one or more virtual machines based on policy. Resource consumption on a hardware device is monitored. A policy that considers at least a present level of resource consumption and an amount of available resources of the hardware device is consulted. An operational state of a particular virtual machine that resides on the hardware device is changed. The change in operational state may be performed to optimize performance of a virtual machine with which a user is interacting, to enforce behavior constraints upon the virtual machine, or to adjust its execution in view of the available resources on the device.

22 Claims, 6 Drawing Sheets

INTELLIGENT MICRO-VIRTUAL MACHINE SCHEDULING

CLAIM OF PRIORITY AND RELATED APPLICATION DATA

This application is a continuation-in-part of, and claims priority to, U.S. non-provisional patent application Ser. No. 13/115,354, filed May 25, 2011, entitled "Approaches for Securing an Internet Endpoint using Fine-Grained Operating System Virtualization," the contents of which are hereby incorporated by reference for all purposes as if fully set forth herein.

Note that U.S. non-provisional patent application Ser. No. 13/115,354 claims priority to U.S. Provisional patent application Ser. No. 61/349,717, filed May 28, 2010, the contents of which are hereby incorporated by reference for all purposes as if fully set forth herein.

This application also is a continuation-in-part of U.S. non-provisional patent application Ser. No. 13/223,091, filed Aug. 31, 2011, entitled "Approaches for Automated Management of Virtual Machines for Running Untrusted Code Safely," the contents of which are hereby incorporated by reference for all purposes as if fully set forth herein.

This application is related to U.S. non-provisional patent application Ser. No. 13/468,781, filed May 10, 2012, entitled "Preparing a Virtual Machine for Template Creation," the contents of which are hereby incorporated by reference for all purposes as if fully set forth herein.

This application is related to U.S. non-provisional patent application Ser. No. 13/468,843, filed May 10, 2012, entitled "Mitigating Virtual Machine Memory Eviction Using Mapping Tables," the contents of which are hereby incorporated by reference for all purposes as if fully set forth herein.

FIELD OF THE INVENTION

Embodiments of the invention relate to adjusting the execution of virtual machines.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The current state of our cyber-security infrastructure is due, at least in part, to two fundamental limitations. The first limitation is a fundamental mismatch between the design assumptions made by computer security programmers with how the vast majority of users interact with the cyber-infrastructure (the "Security Model Complexity" problem). The second limitation is a lack of appropriate isolation of code and data from trusted and untrusted sources in modern computer systems (the "Lack of Isolation" problem). These two limitations of current systems are somewhat orthogonal, but are both very important for securing a computer system. The "Lack of Isolation" problem, in particular, is very important because modern computer devices, such as a PC or cell phone, are typically general purpose devices that execute a wide variety of software from different sources.

The general purpose capability of modern computing systems is constructed using a layered stack of hardware and software. An example of the layered arrangement of hardware and software that is present in modern computer systems is shown in FIG. 1. At the lowest layer, there is hardware with a small number of basic general purpose programming capabilities. Upon this hardware layer sits the firmware/BIOS which is responsible for, among other things, initializing hardware resources and loading the operating system. The operating system (OS) provides a file system and functionality which may be used by a variety of different applications. On top of the OS layer run the various applications which provide user-visible rich functionality to the computer. The functionality provided by the application layer is typically the primary concern of the computer user.

One advantage and consequence of the layered nature of modern computer systems is that the various layers may come from different vendors, as long as the layers conform to the specifications governing the layer boundary (which may be based on open or proprietary industry standards). To illustrate an example, in a typical PC today the hardware may be constructed around processor and chipset technology provided by Intel or AMD. The firmware/BIOS may be provided by companies like Insyde, AMI or Phoenix Technologies and may be written to conform to several industry specifications such as UEFI and PI. The operating system (OS) may originate from a company like Microsoft or Apple or may be a flavor of the Linux open source OS. Finally, the applications themselves are usually written to the specification of one of the operating systems and may be provided by one of a large multitude of application vendors or obtained from a variety of different sources.

Note that some of the applications may themselves have a layered architecture. A web browser, for example, typically includes a browser core and may also download web applications in the form of HTML, JavaScript and Flash programs from various Internet web sites. The web browser may run these downloaded web applications locally on top of the browser core. A typical web page contains HTML with embedded JavaScript that can change the HTML being rendered by the web browser dynamically based on user actions without having to re-download the web page from the web server. The HTML may also demarcate part of the web page to be rendered by a plug-in, which is typically a separate program that is installed on the computer. Plug-ins are often downloaded from different sources over the World Wide Web. Thus, a modern computer runs code that comes from a variety of different sources. In particular, application programs may originate from literally millions of different sources once we consider the collection of traditional local applications as well as web applications that are downloaded from web sites.

The integrity of a computer system when it runs application code from different sources (or even the same program being run by different users of a shared computer) has traditionally been one of the responsibilities of the OS. The OS uses various hardware and software constructs like virtual memory, processes, and file permissions to prevent programs belonging to one user from affecting programs (and data) belonging to another user. This responsibility of the OS to "isolate" programs and data from one another often tends to compete with another responsibility of the OS, which is to allow for cooperation between programs especially between user application programs and system level services such as shared library modules, database services, and other higher-level common OS functionality. These two OS functions, to share and to isolate, require the OS designer to make certain tradeoffs on how much to share and how much to isolate.

As a result of these design tradeoffs, the resulting implementation of modern operating systems has grown to a complexity such that ensuring the OS has no security issues is impractical. In mature operating systems, the security implementation is typically robust enough to work well for normal programs under normal usage with no adverse impact on the operation of the computer. However, most OS implementations are very large and complex bodies of computer code that may not possess a sufficiently robust security system when interacting with programs that are especially designed to take advantage of less-tested or unvalidated corner cases in the operation of the security subsystem.

These "security vulnerabilities" are not important for well-behaved programs during typical operation, but are used extensively by cyber criminals to subvert the computer's security subsystems. Once the system's security is subverted, it is generally possible for cyber criminals to run any software under their control on the subverted computer system.

The Lack of Isolation problem stems from the fact that a large amount of code executed by computers today comes from sources outside the computer, some of which have explicit intentions of committing criminal activities. This includes any program downloaded from the Internet or any web site visited by the computer. All downloaded programs (good and bad) have the same OS and library services available to them to use during their operation. Consequently, any program (even malware), can exploit any security vulnerability in the complex OS or web browser environment and subvert the security subsystem that isolates applications from one another. For example, when a user visits a web site, he or she is really running web application code developed by the publisher of the web site. If this web site is malicious, then malware may be executed on the computer. Malware may be designed to exploit a security vulnerability in the web browser to take control of the computer system during subsequent web site visits, e.g., if you visit your bank's web site, your key strokes may be captured and your login/password information for the bank may be transmitted to the malware publisher. Malicious programs may be designed for a variety of purposes, e.g., a malicious program may simply be designed to interfere with the normal operation of a computer rather than extracting useful data from the computer.

While some computer security professionals may understand the existence of the Lack of Isolation problem, this problem is hard to solve in any practical way because preventing applications from working or communicating with each other tends to conflict with achieving the goal of increasing seamless communication between different local and web applications. There has been some work towards the isolation of web code from different sources being run by a web browser. Modern browsers have attempted to create a level of sandboxing around downloaded web application code in order to isolate downloaded code from the rest of the computer and from each other. However, these models are fairly primitive in their ability to deal with the full gamut of security issues that arise during the course of a typical user's web experience. For example, certain versions of Google's Chrome web browser's sandboxing does not address safety issues arising from downloaded browser plug-ins and various types of native executables; thus, every computer system running certain versions of Chrome is vulnerable to a zero day exploit attack against Adobe Flash or Microsoft Word as much as if the system was running a less secure or older browser with the same Adobe Flash Plug-in or Microsoft Word plug-in.

Web browsers have been burdened with the need to ensure full compatibility to older and non-standard web pages in their efforts to provide superior safety and privacy. For example, web browser programmers have had to make some relaxations in order to correctly render popular web sites that rely on the sharing of information between web sites.

Last but not least, most web browsers vendors suffer from a huge conflict of interest because their business relies upon monetizing the web browsing habits of their users within their own business processes and with their industry partners. This monetization relies on data about users' browsing habits which is contained in the web cookies that are set and later provided to web servers during the course of web sessions. Companies such as Google and Microsoft have a great interest in learning as much as possible about a person's browsing habits and typically arrange the default privacy settings of web browsers to be advantageous to them (but less than optimal from a security and privacy standpoint). This choice of default privacy and core functionality settings causes web browsers to transfer large amounts of sensitive information from end users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser functionality and/or privacy/safety settings to browse more securely, the vast majority of users never change these default settings.

Some security researchers have also proposed the use of "client virtualization" (also called "Virtualization using a Hypervisor" in the desktop) to solve the Lack of Isolation Problem. In one form of client virtualization, the user runs multiple independent operating systems on their laptop or desktop on multiple virtual machines (VMs) within the client system which have been created using a hypervisor, such as from VMWare of Palo Alto, Calif. or Virtual PC, available from Microsoft Corporation of Redmond, Wash. When client virtualization is used to achieve improved security, different VMs are used to run applications from different sources or of different types. For example, an OS in one VM may be dedicated for accessing the corporate network that the user may be part of and running corporate applications (local and web). Another OS in a second VM might be used by the user to run his or her personal programs and store personal documents. Finally, a different OS in a third VM may be used for general web browsing on the wider Internet and running native executables that may have been downloaded from the Internet. An example of such a solution is XenClient, which is made by Citrix Systems of Ft Lauderdale, Fla.

The use of classical client virtualization, as discussed above, to solve the general code isolation problem in the context of Internet endpoints suffers from several drawbacks. A first drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to help prevent the user from making mistakes, this has not yet been demonstrated to work in a practical and robust fashion.

An additional drawback is that client virtualization, as described above, suffers from the problem that any VM that is used for general web browsing is just as vulnerable to a security problem as any monolithic system running a single VM while accessing web sites on the general Internet. Therefore, it is quite likely that the VM dedicated to web browsing described in the arrangement above will be subverted by malware eventually. Any subsequent activities in that VM, then, will be compromised.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
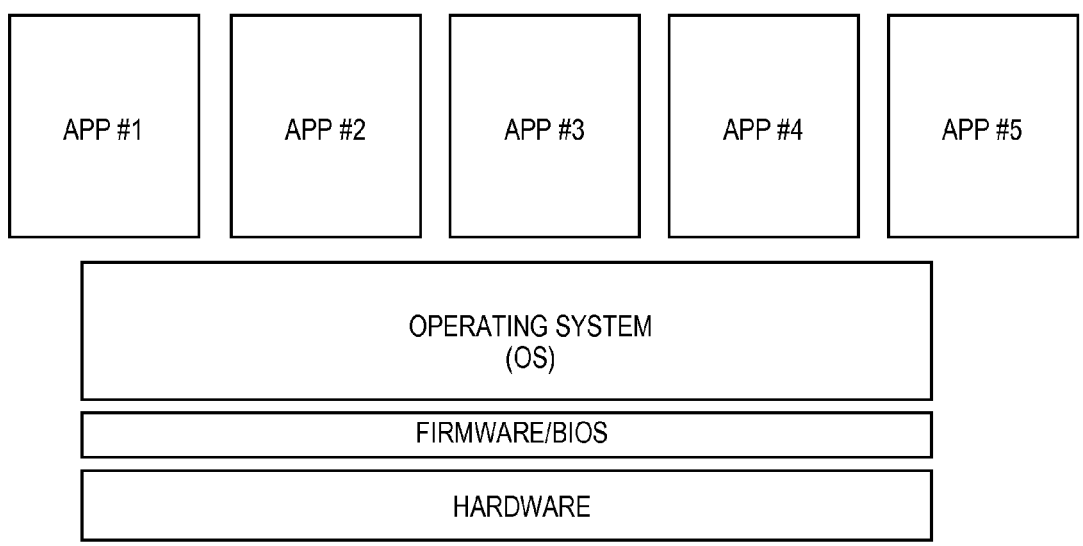
FIG. 1 is an illustration of the layered arrangement of hardware and software present in modern computer systems.

Approaches for adjusting the execution of virtual machines in consideration of available resources are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards adjusting the execution of a large number of virtual machines residing on a single hardware device so that the virtual machines being executed provide an optimal user experience. Embodiments of the invention may be implemented on a wide variety of hardware devices. Non-limiting, illustrative examples of the types of hardware device an embodiment may be implemented on include a personal computer (PC), a router, a cell phone, a tablet PC, a personal digital assistance (PDA), and any computer which executes two or more virtual machines.

In an embodiment of the invention, the resources consumed by all processes across all virtual machines residing on a hardware device are monitored. Additionally, in certain embodiments, the actions performed by a user on the hardware device may also be monitored. The motivation in such monitoring is to obtain a realistic view of how resources are being consumed as well as how a user is actively using the hardware device. Embodiments of the invention adjust how virtual machines are executed to ensure certain virtual machines, such as those whose execution is immediately discernible or noticeably by a user, execute in an optimal fashion.

To do so, in an embodiment, a hardware device stores policy data that defines policies of arbitrary complexity. These policies describe triggering conditions for determining when an operational state of a virtual machine should be changed or when resources allocated to a virtual machine should be adjusted. For example, a policy may consider the present level of resource consumption on the hardware device and an amount of available resources of the hardware device. The policy may indicate that an operational state of a particular virtual machine residing on the hardware device may be programmatically (i.e., not manually) changed or adjusted to make the best use of available resources. In addition to changing the operational state of a virtual machine, a policy may instruct that the resources allocated for a particular virtual machine be adjusted in view of the available resources on the hardware device. A policy may, but need not, indicate that an operational state of a virtual machine or the resources allocated to a virtual machine should be changed in response to user activity. Indeed, a policy may indicate that each virtual machine should be given a minimum amount of access to the CPU so that each virtual machine may have a minimum level of execution.

Operational States of a Virtual Machine

A set of arbitrarily complex policies may be stored on a hardware device. These policies may define conditions, which when satisfied, cause an operational state of one or more virtual machines to be changed. To better appreciate an operational state of a virtual machine, consider FIG. 2, which is a diagram 200 that illustrates the operational states of a virtual machine according to an embodiment of the invention. Diagram 200 depicts four states, namely an executing state 210, a paused state 220, a suspended state 230, and a deinstantiated state 240.

Executing state 210 is meant to represent the state in which a virtual machine is loaded into memory and is currently being executed. Any virtual machine which comprises a running application is in the executing state 210.

Paused state 220 is meant to represent the state in which a virtual machine is loaded into memory but execution of the virtual machine is paused. A virtual machine may enter paused state 220 to reduce or minimize its resource consumption. For example, a virtual machine in paused state 220 is not executed, and so it would not require access to the CPU or require any network resources.

Suspended state 230 is meant to represent the state in which a virtual machine is persistently stored on a storage medium, such as a hard-disk drive or a solid state device, and, as a consequence, is not currently being executed. It requires a certain amount of time to persistently store a virtual machine to a storage medium and to read the virtual machine back into memory once it is persistently stored. Therefore, while a virtual machine does not consume any memory resources in suspended state 230, a virtual machine may not enter suspended state 230 unless it is deemed worthwhile to incur the cost of saving the virtual machine to a persistent storage.

Deinstantiated state 240 is meant to represent the state in which a virtual machine is destroyed or deinstantiated. When a virtual machine is no longer needed, the virtual machine may enter deinstantiated state 240 and be subsequently destroyed or deinstantiated. Once a virtual machine has been destroyed or deinstantiated, it no longer exists and cannot transition to a new operational state.

Figure 2:
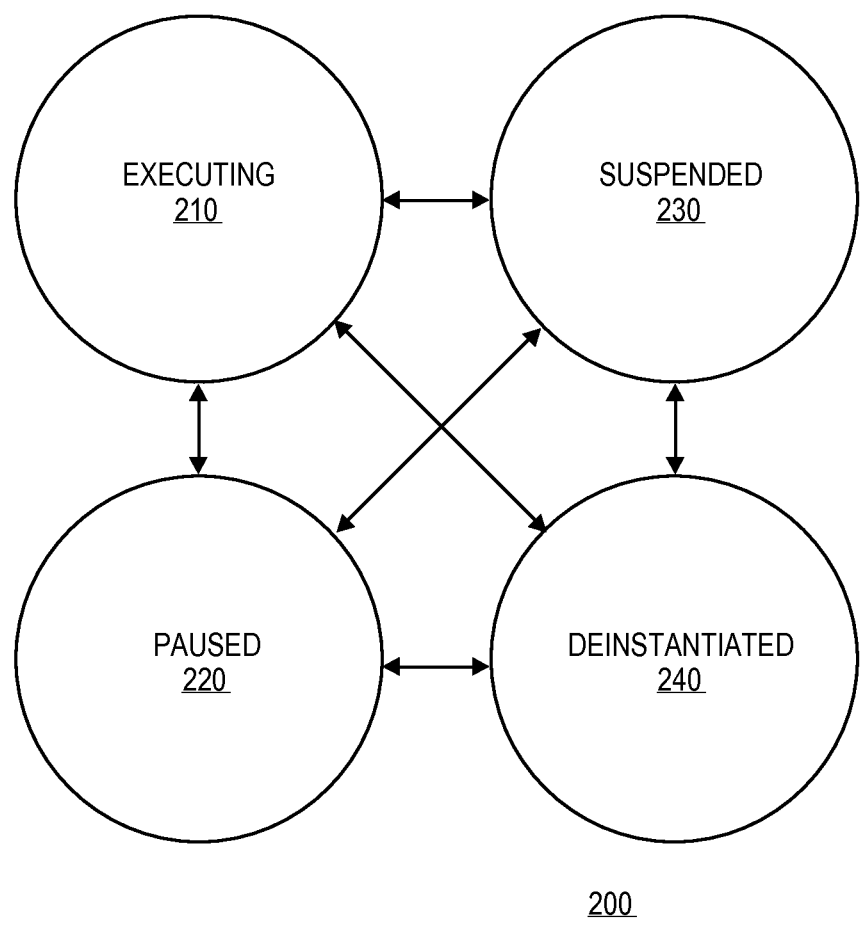
FIG. 2 is a diagram that illustrates the operational states of a virtual machine according to an embodiment of the invention.

While FIG. 2 specifically enumerates four operational states of a virtual machine, other embodiments may employ a virtual machine which may enter a different number of operational states. For example, other embodiments may employ additional operational states that correspond to different levels of resources available or allocated to the virtual machine. As another example, certain embodiments may lack one or more of the operational states depicted in FIG. 2. Thus, FIG. 2 is meant to provide a concrete example of one practical embodiment, but is not meant to portray all embodiments, as the teachings herein may be applied in many contexts involving a different number of operational states.

To illustrate, another operational state of a virtual machine (not depicted in FIG. 2) which may be employed by an embodiment is the tombstone state. A virtual machine in the tombstone state has been deinstantiated; however, information is maintained about that virtual machine so that additional virtual machines may be created to possess the state of resource previously held by the tombstone virtual machine. The name of a resource, such as the name of a file or URL, within a virtual machine entering the tombstone state may be persisted and the remainder of that virtual machine may be destroyed. A new virtual machine may be created, based on the tombstoned virtual machine, to view a URL or a document with the cursor at the same location as within the tombstone virtual machine. By persistently storing the name of the resource and the location of the cursor within this resource, a new virtual machine may be created in reflect the same state of the tombstone virtual machine just prior to its deinstantiation. This would allow virtual machines to be resurrected without swapping the virtual machines. This technique may be used to perform DOM serialization.

Another example of an operational state of a virtual machine (not depicted in FIG. 2) which may be employed by an embodiment is the slowed state. A timer for a virtual machine in the slowed state is adjusted so that it executes at a slower pace than other virtual machines. Similarly, a virtual machine may exist in a fast state whereby the timer for the virtual machine in the fast state is adjusted so that it executes at a faster pace than other virtual machines.

Another example of an operational state of a virtual machine (not depicted in FIG. 2) which may be employed by an embodiment is the precreated state. A virtual machine in the precreated state is created prior to need of its use, and instead, is created based on its anticipated use. In other words, when a policy determines that a virtual machine will be needed shortly to perform a certain task, that virtual machine may be created for that task in the precreated state to reflect that it has been instantiated based on an anticipated, and not present, need.

Description of Components Residing on a Hardware Device

Figure 3:
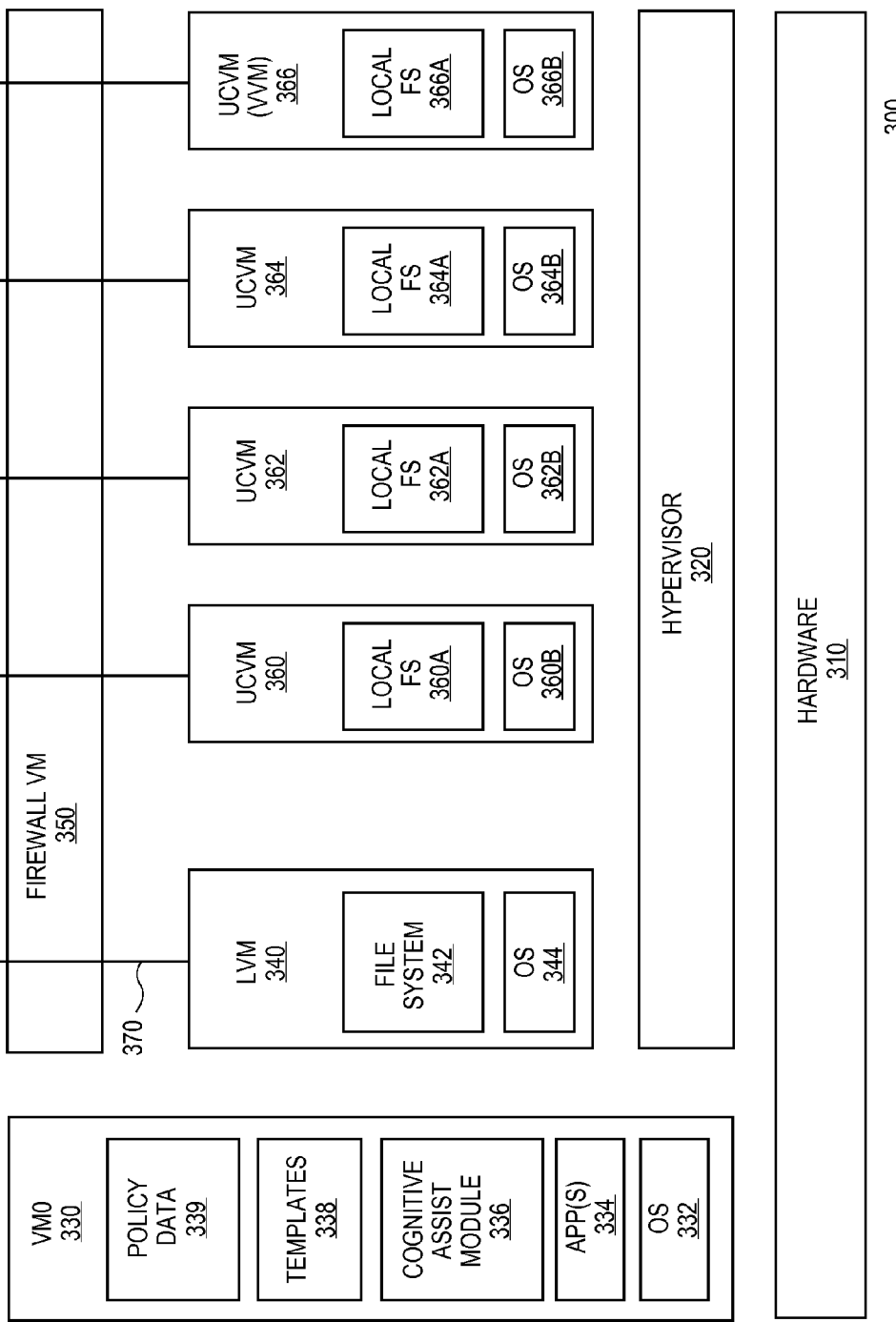
FIG. 3 is an block diagram of the functional components of one embodiment of the invention.

A block diagram of functional components on hardware device 300 (hereafter "device 300") according to one embodiment of the invention is shown in FIG. 3. Hardware device 300 includes a number of virtual machines (such as 330, 340, 350, and 360, for example) that execute on hardware 310 of device 300. The various VMs within device 300 may be used for separately executing processes associated with different activities. One such VM, namely "VM0" (i.e., VM0 330 of FIG. 3), is secured so that VM0 may serve as the root of trust with a guaranteed integrity. VM0 may contain core operating system 332 and one or more applications 334. In the embodiment shown in FIG. 3, VM0 is not accessible over any network, such as the Internet. As shall be explained below, VM0 provides a secure environment in which operating system 332 and one or more applications 334 may execute without risk of exposure to malicious code.

Other VMs, such as VMs 360, 362, 364, and 366 in FIG. 3, may be created, maintained, and destroyed on-demand using a very efficient micro-virtualizing hypervisor 320. Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 320 in FIG. 3 may either be a Type 1 or a Type 2 hypervisor.

Using the efficient micro-virtualization techniques of embodiments, the latency of starting and stopping activities or applications which run in their own VM in embodiments is very low, thereby providing a practical user experience while employing full OS virtualization. Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

Embodiments of the invention may employ virtual machines that have different characteristics that are designed or suited for specific contexts. For example, FIG. 3 depicts several specialized virtual machines, namely VM0, a LVM, a firewall VM, and a VVM. A brief description of each of these types of virtual machines will now be presented.

The Trusted Virtual Machine—VM0

In an embodiment of the invention, a special virtual machine, referred to herein as "VM0," is created to be a trusted and secure portion of a computer system. FIG. 3 depicts VM0 330 according to an embodiment. To achieve the property of being trusted and secure, VM0 330 may be permanently disconnected from any network (i.e., VM0 330 is not connected to any local network or the Internet). Specifically, VM0 330 may not contain any type of networking stack, such as a TCP/IP network stack, and may not have access to any networking hardware that could allow for communication between VM0 330 or any applications 334 executed thereby and the Internet. Thus, to install software onto VM0 330, it is typically required to have physical custody of device 300 and manually install the software onto VM0 330. Note that a client may contain any number of VM0 virtual machines. While FIG. 3 depicts an embodiment comprising a single VM0, other embodiments may comprise two or more VM0s.

Thus, in certain embodiments, one or more applications 334 executing within VM0 330 do not have any access to a network, must be fully self contained in their functionality, and must rely only on local code and data for all their functionality. All applications that need to access the network will therefore need to run in a separate virtual machine outside of VM0 330, as shall be described in further detail below. It is envisioned that the software (such as one or more applications 334) running in VM0 be selected at the time device 300 is manufactured or first configured for use in a controlled environment. If VM0 330 is not connected to any type of network, such as a TCP/IP network, all common types of network initiated attacks cannot be waged against VM0 330, thereby rendering VM0 330 immune to such attacks and safe as compared to any computer or VM that is connected to the Internet.

In an embodiment where hypervisor 320 is a Type 2 hypervisor, when device 300 is booted, only VM0 330 is started by the BIOS or firmware of device 300. Once VM0 330 is running, VM0 330 can start hypervisor 320 immediately or on demand. In another embodiment, where hypervisor 320 is a type 1 hypervisor, hypervisor 320 is first started by the BIOS when device 300 is booted and VM0 330 is launched by the Hypervisor 320. Hypervisor 320 is a software component that is responsible for creating other VMs which each execute independent instances of the operating system. These additional VMs are instantiated by VM0 330 and/or hypervisor 320 to run any untrusted code or code that needs to access the network. Untrusted code in this context is any code which has not been pre-approved as being trusted by an IT administrator of device 300. The additional VMs are started "silently" and automatically by device 300, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in device 300. Embodiments of the invention follow rules that govern what application activities are assigned to which particular VM. These rules are described below in greater detail.

In another embodiment (not depicted in FIG. 3), VM0 330 may have a networking stack that is firewalled off from the network using well-tested firewall software, thereby allowing VM0 330 to have access to a computer network. Such an embodiment may only allow connections with a specific Internet system so that the software inside VM0 330 may be updated from a designated update server. For example, the firewall software may only allow VM0 330 to connect to one or more servers associated with the IT administrator of device 300 and may prevent VM0 330 from establishing a connection with any other endpoint on any network.

In an embodiment, all code responsible for generating a user interface (UI) not associated with an application may be maintained in VM0 330. Consequently, all UI interaction activity with the desktop between a user and software executing on device 300 may take place between the user and VM0 330, which maintains a unified desktop for all applications running in all VMs. Interaction between the user and applications running in VMs other than VM0 330 takes place indirectly via VM0 330. For example, when the user enters a password for a web site whose browser and HTML/JavaScript code is running in an untrusted VM, the password is first directly provided to VM0, which then transfers the information to the untrusted VM. Furthermore, the untrusted VM's display is rendered on to a virtualized display, which is then composed into the VM0 desktop (as appropriate) by controlling code running in VM0 330. As code executing in VM0 330 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in a secure location, such as the host or VM0, malware is prevented from hijacking or corrupting code responsible for rendering a user interface.

Figure 4:
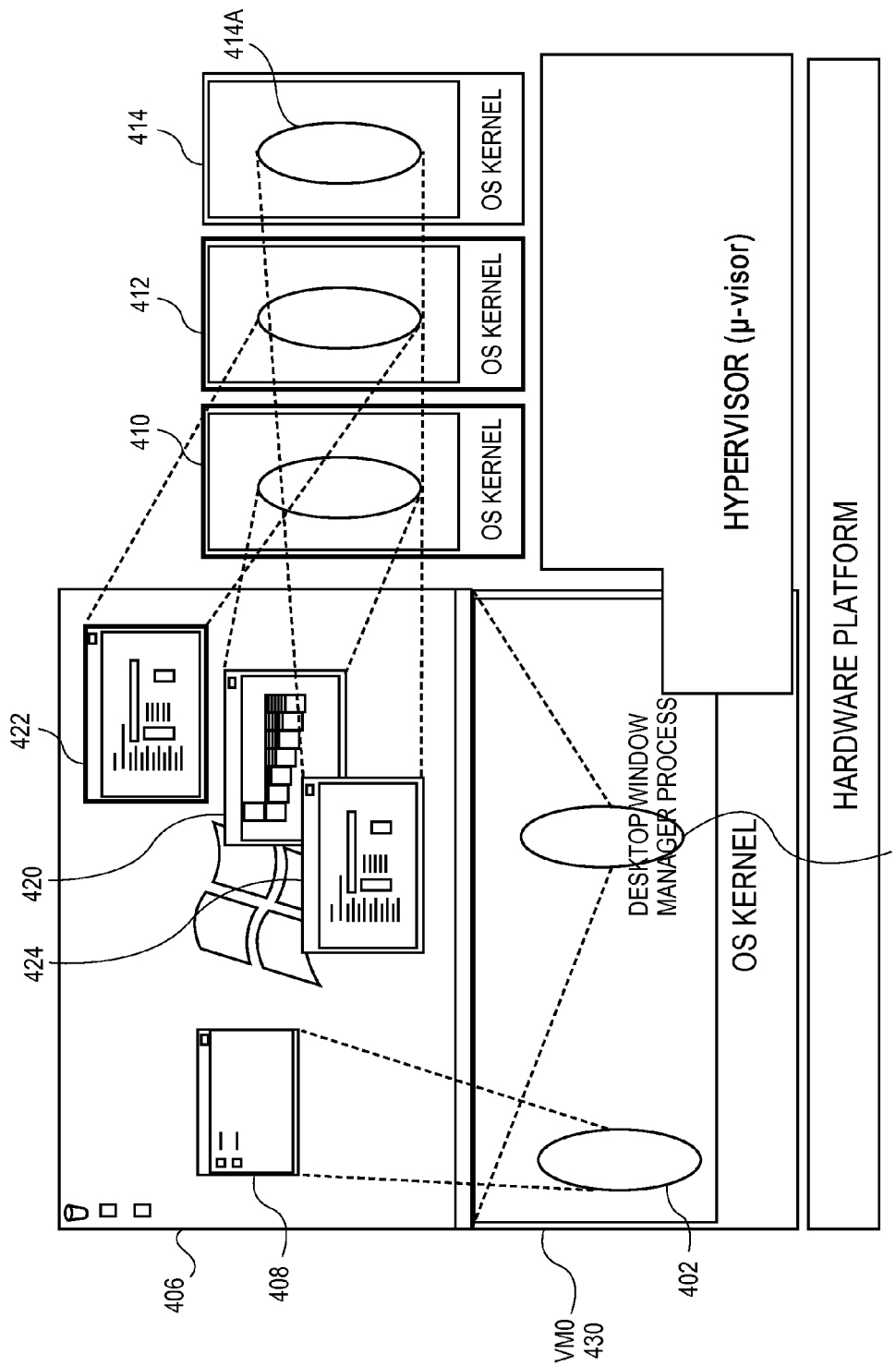
FIG. 4 is an illustration of exemplary desktop of a client according to an embodiment of the invention.

FIG. 4 is an illustration of exemplary desktop of device 300 according to an embodiment. As shown in FIG. 4, process 404 is responsible for rendering desktop 406 on a physical display of device 300. Process 414A runs in untrusted VM 414 and does not have complete access to the file system of device 300. When any process inside VM 414 requests access to the file system of device 300, it is intercepted and process 402 is responsible for rendering a window 408 depicting the contents of the file system of device 300. Process 402 has the option of selectively displaying which contents are available to the VM 414 based on policies as set forth by the IT administrator or the user. VM 410 in FIG. 4 that runs the solitaire game is implemented such that the display of VM 410 is a virtualized display, which is then composed into the desktop 406 (as appropriate) by controlling process 404 running in VM0 330. The displays of VMs 412 and 414 are rendered on the desktop 406 in a similar fashion.

Note that in certain embodiment code that is responsible for rendering a user interface may execute in both the host and one or more virtual machines, such as VM0. In such a case, the UI-rendering code executing in the host will assemble all the off-screen buffers of the UI-rendering code executing in the virtual machines to present a single on-screen image. As a result, the UI-rendering code executing in the host may render certain content portions differently based on whether they are trusted or not. For example, a window frame may be displayed having a particular color by the UI-rendering code executing on the host to signify that the content displayed therein originated from an untrusted source. Any type of visual identifier, such as a color, font, graphic, or banner may be used to signify that content originated from an untrusted source.

The Legacy Virtual Machine—LVM

FIG. 3 depicts a legacy virtual machine (LVM) 340 according to an embodiment of the invention. LVM 340 may contain operating system 344. LVM 340 serves as the primary entity being managed by the IT administrator of device 300. As such, LVM 340 provides an environment that is analogous to the managed enterprise OS of corporate computer system in that an IT department may install and maintain various enterprise applications within operating system 344 of LVM 340. In an embodiment, operating system 344 of LVM 340 may correspond to a Microsoft Windows OS or any other general purpose OS such as Linux or MacOS.

In an embodiment, LVM 340 is responsible for storing the main file system 342 of device 300. File system 342 may contain the user's profile folder containing the user's settings and files.

LVM 340 typically only runs infrastructure OS programs and programs that are used for the purpose of managing device 300 and trusted enterprise applications. Other user programs (especially those that involve external components or consume untrusted data) do not run in LVM 340, but instead, run elsewhere in separate VMs (such as a UCVM as described in more detail below).

In an embodiment, the network access of LVM 340 is restricted to just the corporate network as implemented by firewall VM 350. Firewall VM 350 is a specialized virtual machine that comprises firewall software/applications to restrict network access of VMs running in device 300 to appropriate and/or necessary network access points. Such practice is consistent with the need for only the responsible IT administrator to be capable of connecting to LVM 340 to manage LVM 340 and processes executing therein.

In one embodiment, LVM 340 and VM0 330 may be implemented in a single virtual machine.

Untrusted Code Virtual Machine—UCVM

When a user wishes to run any application that requires access to either a network or untrusted data (untrusted data is any data that originates from outside device 300), the application is run inside a dedicated VM that is created on-demand by hypervisor 320. This dedicated VM is called an Untrusted Code Virtual Machine (or UCVM). FIG. 3 depicts several UCVMs, namely UCVM 360, 362, 364, and 366. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 340, or a stripped-down version of LVM 340, in memory and (b) providing access to a restricted file system to the newly created UCVM. For example, UCVM 360 comprises restricted file system 360A, UCVM 362 comprises restricted file system 362A, and UCVM 364 comprises restricted file system 364A. Each UCVM possesses its own instance or copy of the operating system, which is isolated and separate from the main operating system (including its code and data) executing within VM0 330 or LVM 340. For example, UCVM 360 comprises operating system 360B, UCVM 362 comprises operating system 362B, and UCVM 364 comprises operating system 364B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 338 stored in VM0 330. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 336 is software that is responsible for implementing the rules and policies of embodiments as well as helping the user of device 300 in understanding and navigating the security model employed by device 300 on an as-needed basis. Cognitive assist module 336 helps decide what activities run in which UCVMs, including when VMs are created or destroyed, and what kind of access to network and file system resources each UCVM has. Cognitive assist module 336 also helps protect the user, e.g., when a user is fooled by malware running in a UCVM and is in the process of providing some information that they have previously provided to enterprise code running in LVM 340 (for example a password), then cognitive assist module 336 may detect this situation and prevent the user from providing the information (which may be secret corporate information) to the malware.

Regarding the restricted file system of each UCVM, each UCVM has access to a private copy of a subset of the files in file system 342 on device 300. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 360 as an example, if a process executing within UCVM 360 makes any changes to any files in restricted file system 360A, then these changes do not impact the files stored in file system 342 maintained in LVM 340 because such changes are only made to restricted file system 360A maintained in the UCVM and are not propagated, without express consent from the user, to file system 342 maintained by LVM 340.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 336 of VM0 330 may dynamically create the UCVM using a template in one or more templates 338 or use a pre-existing template in memory or on the disk. The template selected by cognitive assist module 336 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 330. On the other hand, executable code for the three web applications runs in three separate UCVMs. A core HTML/JavaScript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which device 300 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for device 300.

Firewall Virtual Machine

In an embodiment, the implementation of the network access restrictions is done in a dedicated VM called a firewall VM. FIG. 3 depicts an exemplary firewall VM 350 of an embodiment. Firewall VM 350 runs an isolated operating system with a dedicated and fixed set of firewall applications that implement the network access policy for all VMs in device 300 (except perhaps VM0, which may not have any network access). Firewall VM 350 may provide, to any virtual machine running on device 300 in which untrusted code is executed or untrusted data is being interpreted, restricted access to only those network resources deemed necessary on an as-needed basis in accordance with a policy described by policy data stored on device 300.

In another embodiment of the invention, the firewall functionality of the system may be co-located and implemented inside either the hypervisor 320 of FIG. 3, or inside the LVM 340 of FIG. 3 (working in conjunction with the hypervisor 320 of FIG. 3), or inside VM0 330 of FIG. 3 (working in conjunction with the hypervisor 320 of FIG. 3).

Validated Virtual Machine—VVM

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 3 depicts an exemplary VVM 366 of an embodiment. Note that while FIG. 3 depicts a single VVM for ease of explanation, other embodiments of the invention may employ two or more VVMs or no VVMs based upon the particular needs of the user and/or policies of the organization responsible for or the owner of device 300.

Applications need to be signed and configured for co-location in the same VM by an administrator of device 300 before they can run in VVM 366. Inside VVM 366, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 342 exposed to a VVM is similar to that exposed to a generic UCVM in that the restricted copy of file system 342 exposed to a VVM comprises only those files related to, or required for, performance of the applications executing within the VVM.

Having described the functional components which may reside on device 300 of an embodiment, additional details about how the execution of virtual machines on device 300 may be programmatically adjusted to optimize performance.

Programmatically Adjusting the Execution of a Virtual Machine

In an embodiment of the invention, cognitive assist module 336 may consult policy data 339 to adjust the execution of one or more virtual machines. While policy data 339 is depicted in FIG. 3 as being stored within VM0 330, in other embodiments of the invention, policy data 339 may reside in other locations, such as a virtual machine that is configured to be persisted.

Figure 5:
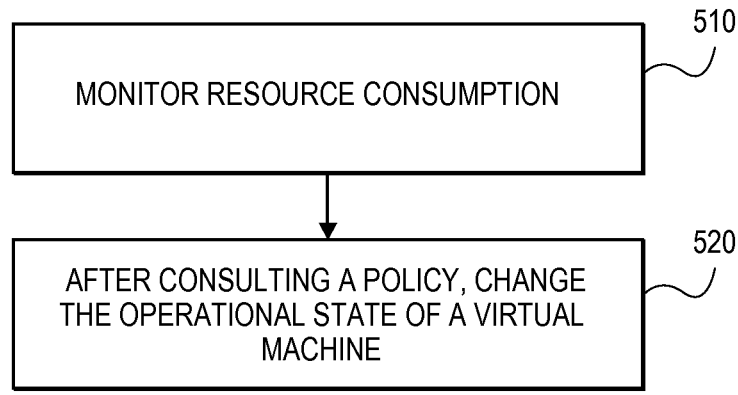
FIG. 5 is a flowchart illustrating the steps of programmatically adjusting the execution of one or more virtual machines according to an embodiment.

FIG. 5 is a flowchart illustrating the steps of programmatically adjusting the execution of one or more virtual machines according to an embodiment. In step 510, cognitive assist module 336 monitors resource consumption on device 300. Non-limiting, illustrative examples of resources of device 300 which may be monitored include memory, storage space, access to the CPU, access to an input/output device, and the like. The resource consumption of all virtual machines residing device 300 may be monitored in step 510.

Additionally, cognitive assist module 336 may determine the total available resources available on device 300. As a result, cognitive assist module 336 may obtain an accurate perspective of how many resources each virtual machine is consuming relative to each other and relative to the overall amount of available resources.

In some embodiments, in step 510, cognitive assist module 336 may also monitor what actions a user is taking with respect to device 300. For example, if the user is actively using one or more applications, then cognitive assist module 336 may take note of this use. The motivation in doing so is to determine which virtual machines the user is actively using or interacting with so that these virtual machines may ensure these virtual machines provide an optimal user experience.

In certain embodiments, a historical record of resource consumption of, and user actions involving, device 300 may be maintained. Such records may be used by policies defined in policy data 339. For example, certain policies may consider certain thresholds calculated over a period of time.

In step 520, cognitive assist module 336 consults a policy defined by policy data 339. Cognitive assist module 336 may consult policy data 339 after the occurrence of a specified period of time or after a specified event. In response to consulting the policies defined by policy data 339, cognitive assist module 336 may change an operational state of a particular virtual machine on device 300. Note that the operational state of the particular virtual machine may be changed in step 520 programmatically by cognitive assist module 336; as such, the operational state is not changed manually in step 520.

The policy consulted in step 520 may consider a number of different factors in articulating reasons for changing an operational state of a virtual machine. For example, the policy may consider a present level of resource consumption and an amount of available resources of device 300. The policy may also consider a host of other factors, including but not limited to one or more of: a current state of a battery, whether the hardware device is operating on a battery or is plugged-in, the current memory usage, the current utilization of the CPU, the current utilization of persistent storage, and how long ago the user interacted with a process executing within the particular virtual machine. Another factor which may be considered is whether a particular virtual machine has the resources it needs to meet a minimum quality of service (QoS), and if not, additional resources may be allocated to that virtual machine so that it can achieve its QoS obligations. Alternately or additionally, in certain embodiments a policy may consider a historical record of resource consumption and/or user actions involving device 300 in defining conditions for changing the operational states of virtual machines on device 300.

These factors may be referenced by a policy to determine whether to adjust how many resources a virtual machine is consuming. If there are plenty of available resources, then a virtual machine may be provided additional resources. Alternately, if resources on device 300 are scarce, the resources provided to a virtual machine may be scaled back.

Advantageously, in an embodiment, virtual machines in which a user is actively interacting with may be provided additional resources, or at least sufficient resources, to ensure that the user receives a certain quality of service. For example, a virtual machine in which a background process is executing may have its allotted resources (such as CPU access) diminished since the user will not be able to detect that the background process is executing in a slightly slower manner due to the reduced access to the CPU. However, a user may immediately notice if a video or other application he or she is actively using starts to experience a performance degradation. Therefore, applications and processes in which a user is activity using will, in an embodiment, receive sufficient resources to provide the expected level of performance if at all possible. To this end, in an embodiment, the policy may cause one or more virtual machines to be configured, without human intervention, with a minimum amount of one or more types of resources at all times.

Executing state 210 requires the most resources, followed by paused state 220, and then suspended state 230; naturally, deinstantiated state 240 does not require any resources since it results in the destruction of the virtual machine. If all of the virtual machines on device 300 are consuming a large amount of resources, then one or more virtual machines may have their allocated resources reduced or their operational state changed to a state which requires fewer resources. Conversely, if all of the virtual machines on device 300 are consuming a relatively small amount of resources, then one or more virtual machines may have their allocated resources increased or their operational state changed to a state which involves a greater allocation of resources.

Certain embodiments may predict what type of application or process a user may have need of in the future. If cognitive assist module 336 determines that the user will likely need an application or process residing within a virtual machine in suspended state 230, cognitive assist module 336 may load at least a portion of the virtual machine from a persistent storage into memory prior to receiving the request to execute the application or process. Embodiments may also keep a number of the most frequently used virtual machines executing at all times or may provide additional resources to those virtual machines.

In an embodiment, a policy defined by policy data 339 may specify that the rate in which communications may be exchanged between a host operating system (which may reside in VM0 330 in an embodiment) and a virtual machine of the hardware device be adjusted. In this way, the rate of communications between virtual machines may be adjusted based on the available resources for doing so in a manner that is dynamic and transparent to the user.

Note that a plurality of applications may execute within a single virtual machine. Embodiments may track whether one application has a dependency upon another application. Applications may have dependencies upon other applications running in the same virtual machine or a different virtual machine. Application dependencies may also be a factor in adjusting the operational state of a virtual machine. For example, if a parent application is changed to a certain operational state, then any child applications may also be correspondingly updated as well.

It may take a certain amount of time for a virtual machine to transition from one operational state to another operational state. For example, if a virtual machine transitions from executing state 210 to suspended state 230, it will take a certain amount of time to write the contents of that virtual machine to persistent storage. As a result, policies of an embodiment take into account the time involved in transitioning from one operational state into another when determining whether an operational state transition should be made.

In an embodiment, a change in operation state in a virtual machine from suspended state 230 to a state where the virtual machine is maintained in memory may be aborted upon determining that the user no longer desires to interact with the virtual machine prior to the change in operational state being completed.

Policies May Define Allowable Virtual Machine Behavior

Certain policies may also define behavior which may be prohibited. Cognitive assist module 336 may prohibit the performance of any type of virtual machine behavior which conflicts with the policies defined by policy data 339. To provide a concrete example, a policy may define conditions upon which a virtual machine is allowed to play an audio or video file. For example, a policy may prohibit two or more virtual machines from playing an audio file or a video file simultaneously. As another example, a policy may prohibit a virtual machine from playing a video file unless the video file is displayed on device 300 in an unobstructed manner. In this way, a web page which is playing a video behind several other windows, and therefore is not visible to the user, may be prevented from using resources needlessly. The polices may define a variety of prohibited behaviors to prevent virtual machines from using resources of device 300 needlessly or in a manner that impacts high priority processes.

Collecting Data about the Operation of Virtual Machines on a Device

In an embodiment, cognitive assist module 336 monitors the consumption of resources on device 300 across all virtual machines residing thereon. Further, cognitive assist module 336 may also ascertain what specific hardware components are either installed or comprised within device 300 as well as may determine that total amount of available resources of device 300. In this way, cognitive assist module 336 may determine a measure of the efficiency for software executing within each virtual machines on device 300.

In an embodiment, cognitive assist module 336 may provide, to a location across a network (such as a server), information about the actions performed by the virtual machines on device 300. Such information may also identify hardware components of device 300 and/or the efficiency of software executing within virtual machines on device 300. Such information may be collected from all devices of an organization. This information may be displayed or presented to an administrator using a graphical user interface.

Using this graphical user interface, the administrator may be able to determine a variety of different insights. For example, by examining the efficiency of the software executing on the hardware components across all devices of the organization, the administrator may be able to determine which devices would benefit most from new hardware components, such as memory or additional storage capacity. A prioritized list of which devices should be replaced based on a variety of different criteria may be generated programmatically. Further, a comparison of the cost of ownership versus the actions performed on the virtual machines of a device may be computed. In this way, the administrator may see which types of hardware provide the best value for the organization based on how they are actually being used by the organization.

Additionally, the administrator may be able to detect when portions of the organization are experiencing similar problems or exhibiting similar patterns, such as experiencing virus problems.

The utilization of each device in the organization may also be calculated by embodiments. A report of which virtual machines were executed by which device may be programmatically determined based on the collected information. This would provide business insight into what types of virtual machines are being launched most frequently.

Graphical Visualization of a Suspended Virtual Machine

A user may use device 300 in a variety of different ways. The user may be inclined to start a large number of applications on device 300. As a result, the user may launch a large number of virtual machines. Over the course of time, some of the virtual machines may be actively used, while others may not be used as much, or at all. However, all of these virtual machines would continue to use resources.

Embodiments of the invention discussed above programmatically adjust the operational states of virtual machines. For example, a web browser may retrieve and render content associated with each tab of the web browser in a separate virtual machine. If the user does not select a tab of the web browser for an extended period of time, policies defined in policy data 339 may indicate that the virtual machine responsible for retrieving and rendering the content for that tab may be suspended to converse resources.

If the user clicks on that tab, the user will expect to see an image produced by that virtual machine. It would be undesirable for the user to have to wait while the virtual machine resumes execution so that it may produce a rendered image of the content associated with that tab. Advantageously, embodiments of the invention overcome this issue by displaying a graphical representation of a suspended virtual machine.

Figure 6:
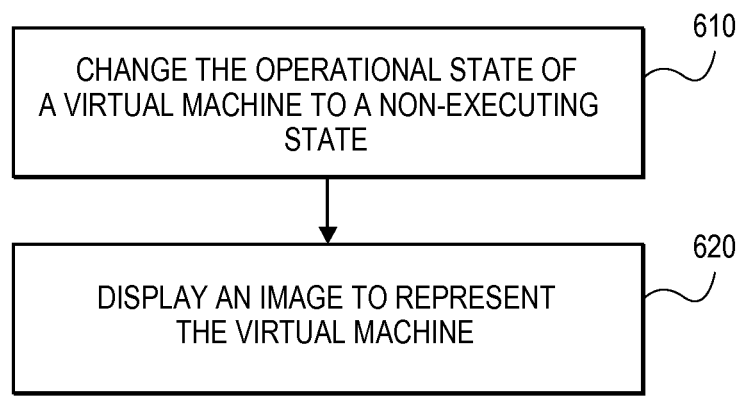
FIG. 6 is a flowchart of the steps performed in displaying a graphical visualization of a suspended virtual machine according to an embodiment.

FIG. 6 is a flowchart of the steps performed in displaying a graphical visualization of a suspended virtual machine according to an embodiment. In step 610, an operational state of a virtual machine on device 300 is programmatically changed from a first state to a non-executing state. A non-executing state may either be paused state 220 or suspended state 230. Step 610 may be performed as discussed above with respect to FIG. 5.

In step 620, an image is displayed by cognitive assist module 336 to represent the non-executing virtual machine. The image may be based upon the state of the virtual machine immediately prior to the virtual machine entering the non-executing state. For example, the image may be a portion of the desktop for the virtual machine immediately prior to the virtual machine entering the non-executing state. This image advantageously would allow a user to identify which tab of a web browser the user is interested in, even if separate suspended or paused virtual machines are responsible for rendering content for those tabs. The image may be a real-size snapshot of the application window or desktop of the suspended virtual machine and is intended to be an accurate depiction of the application or virtual machine.

In response to receiving a request to transition the virtual machine from the non-executing state to executing state 210, the image may ceased being displayed by transparently replacing the image with a graphical depiction generated by the virtual machine once execution has commenced.

Storing and Restoring a Virtual Machine

A virtual machine may be "saved to disk" by unloading the virtual machine from the memory of the hypervisor and moving the virtual machine to a lower performance storage, which typically will be the disk. When a VM (or a template VM) is "saved to disk," the disk id (the disk id is the virtual disk file containing the disk block and refers to the particular virtual disk file in a potentially layered chain of copy-on-write files) and offset information associated with each page that is a pristine copy of something on disk may also saved.

In the circumstance where a virtual machine is created based on a template VM, as an optimization to reduce the amount of data that is transferred to disk, only the pages in memory which are private (i.e., have been allocated as a result of a copy-on-write process) to this VM are saved to disk, while for non-private pages references to the corresponding locations in the template VM and/or zero pages are stored. Note that the template VM must be loaded before it is possible to restore any VM that was created using a copy-on-write process based on the template VM.

Additional details about saving and restoring a virtual machine are provided U.S. non-provisional patent application Ser. No. 13/468,843, which is incorporated by reference herein.

Hardware Mechanisms

Figure 7:
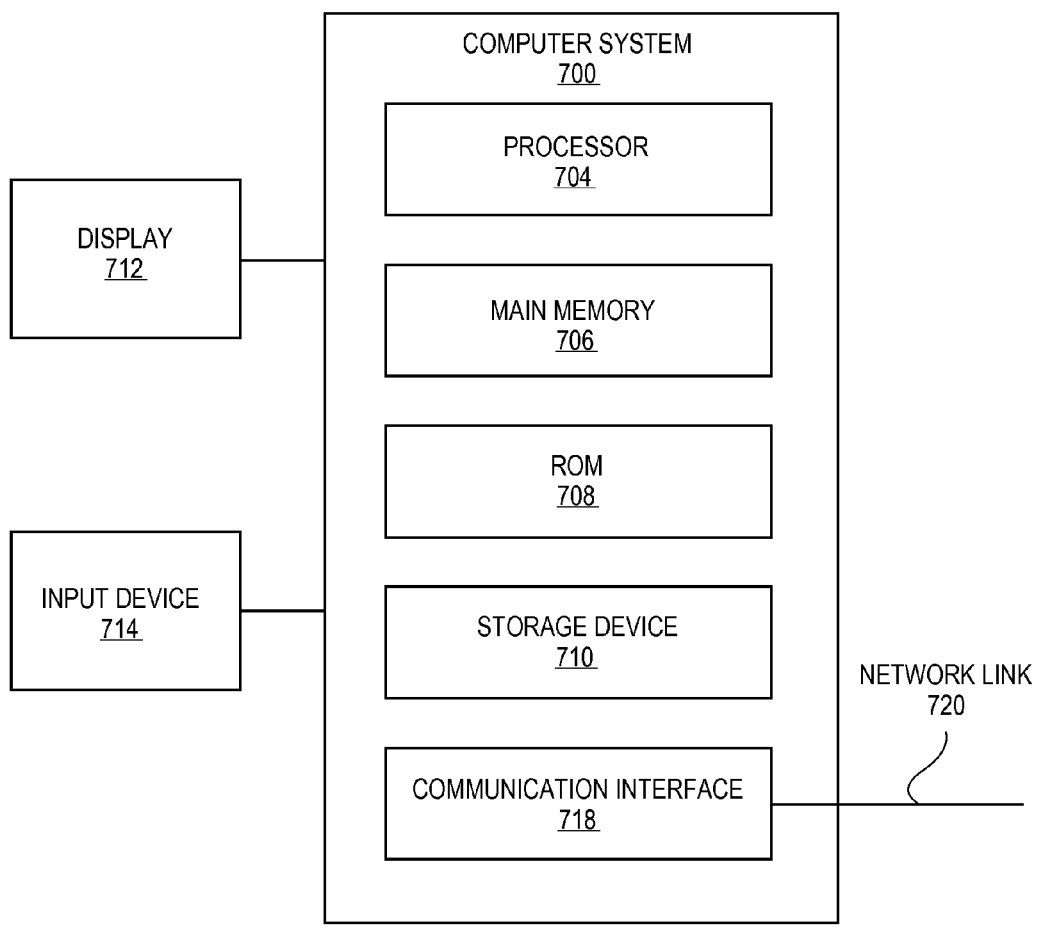
FIG. 7 is a block diagram that illustrates a computer system upon which an embodiment of the invention may be implemented.

In an embodiment, device 300 of FIG. 3 may be implemented on, include, or correspond to a computer system. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for managing a plurality of virtual machines upon a hardware device, which when executed by one or more processors, causes:
monitoring resource consumption on the hardware device; and
upon consulting a policy that considers at least a present level of resource consumption and an amount of available resources of the hardware device, programmatically changing an operational state of a particular virtual machine of the plurality of virtual machines that reside on the hardware device to ensure a minimum level of quality of service (QoS) for an executing virtual machine in which the user is presently interacting without maintaining the minimum level of quality of service (QoS) for certain virtual machines in the plurality of virtual machines in which the user is not presently interacting, wherein the policy identifies the minimum level of quality of service (QoS).

2. The one or more non-transitory computer-readable storage mediums of claim 1, wherein each virtual machine residing on the hardware device exists in one of a plurality of operational states, and wherein the plurality of operational states include an executing state, a paused state, and a suspended state.

3. The one or more non-transitory computer-readable storage mediums of claim 1, wherein programmatically changing the operational state is performed, at least in part, to provide a virtual machine, with which a user of the hardware device is presently interacting, sufficient resources to provide a specified quality of service to the user.

4. The one or more non-transitory computer-readable storage mediums of claim 1, wherein the operational state of the particular virtual machine is changed to a new operational state based, at least in part, upon the consumption of resources by all the plurality of virtual machines residing on the hardware device.

5. The one or more non-transitory computer-readable storage mediums of claim 1, wherein execution of the one or more sequences of instructions further cause:
upon determining that a user of the hardware device will likely request an action that will be designated to be performed by a virtual machine currently in the suspended state, loading at least a portion of said virtual machine from a persistent storage into memory prior to receiving said request for said action from the user.

6. The one or more non-transitory computer-readable storage mediums of claim 1, wherein the policy defines conditions upon which virtual machines are allowed to play an audio or video file, and wherein execution of the one or more sequences of instructions further cause:
preventing a virtual machine from playing an audio file or a video file if a violation of the policy would result.

7. The one or more non-transitory computer-readable storage mediums of claim 6, wherein the policy does not permit two or more virtual machines to play an audio file or a video file simultaneously.

8. The one or more non-transitory computer-readable storage mediums of claim 6, wherein the policy does not permit a virtual machine to play a video file unless the video file is displayed on the hardware device in an unobstructed manner.

9. The one or more non-transitory computer-readable storage mediums of claim 1, wherein the policy causes one or more virtual machines to be configured, without human intervention, with a minimum amount of one or more types of resources at all times.

10. The one or more non-transitory computer-readable storage mediums of claim 1, wherein the policy consider one or more of the following factors: a current state of a battery supplying power to the hardware device, whether the hardware device is operating on a battery or is plugged-in, a current memory usage, and how long ago the user interacted with a process executing within the particular virtual machine.

11. The one or more non-transitory computer-readable storage mediums of claim 1, wherein execution of the one or more sequences of instructions further cause:
providing, to a location across a network, data describing actions performed by virtual machines executing on the hardware device.

12. The one or more non-transitory computer-readable storage mediums of claim 11, wherein said data further identifies hardware components of the hardware device and a measure of the efficiency of software executing within the virtual machines on the hardware device.

13. The one or more non-transitory computer-readable storage mediums of claim 1, wherein execution of the one or more sequences of instructions further cause:
upon consulting the policy, adjusting the rate in which communications may be exchanged between a host operating system and a virtual machine maintained in an executing state of the hardware device.

14. The one or more non-transitory computer-readable storage mediums of claim 1, wherein the policy, in determining what resources should be allotted to a virtual machine, considers whether the result of activity performed by the virtual machine is perceptible to a user of the hardware device.

15. The one or more non-transitory computer-readable storage mediums of claim 1, wherein a plurality of applications execute within the particular virtual machine, and wherein the policy considers each of the plurality of applications in identifying the new operational state to which the particular virtual machine is changed.

16. The one or more non-transitory computer-readable storage mediums of claim 1, wherein execution of the one or more sequences of instructions further cause:
storing a historical record of resource consumption of, and user actions involving, the hardware device,
wherein the policy considers the historical record in defining conditions for changing the operational states of virtual machines on the hardware device.

17. A hardware device that transparently manages a plurality of virtual machines residing thereon, comprising:
one or more processors; and
one or more computer-readable storage mediums storing one or more sequences of instructions, which when executed by the one or more processors, cause:
monitoring resource consumption on the hardware device; and
upon consulting a policy that considers at least a present level of resource consumption and an amount of available resources of the hardware device, programmatically changing an operational state of a particular virtual machine of the plurality of virtual machines that reside on the hardware device to ensure a minimum level of quality of service (QoS) for an executing virtual machine in which the user is presently interacting without maintaining the minimum level of quality of service (QoS) for certain virtual machines in the plurality of virtual machines in which the user is not presently interacting, wherein the policy identifies the minimum level of quality of service (QoS).

18. The apparatus of claim 17, wherein programmatically changing the operational state is performed, at least in part, to provide a virtual machine, with which a user of the hardware device is presently interacting, sufficient resources to provide a specified quality of service to the user.

19. The apparatus of claim 17, wherein the operational state of the particular virtual machine is changed to a new operational state based, at least in part, upon the consumption of resources by all the plurality of virtual machines residing on the hardware device.

20. One or more non-transitory computer-readable storage mediums storing one or more sequences of instructions for managing a plurality of virtual machines upon a hardware device, which when executed by one or more processors, causes:
   monitoring resource consumption of, and user actions involving, the hardware device; and
   upon consulting a policy that considers at least a present level of resource consumption, current user interactions with the hardware device, and an amount of available resources of the hardware device, programmatically changing an operational state of a particular virtual machine, of the plurality of virtual machines that reside on the hardware device, to provide the particular virtual machine with sufficient resources to provide a specified quality of service to the user to ensure a minimum level of quality of service (QoS) for an executing virtual machine in which the user is presently interacting without maintaining the minimum level of quality of service (QoS) for certain virtual machines in the plurality of virtual machines in which the user is not presently interacting, wherein the policy identifies the minimum level of quality of service (QoS).

21. The one or more non-transitory computer-readable storage mediums of claim 20, wherein the operational state of the particular virtual machine is changed to a new operational state based, at least in part, upon the consumption of resources by all the plurality of virtual machines residing on the hardware device.

22. One or more non-transitory computer-readable storage mediums storing one or more sequences of instructions for managing a plurality of virtual machines upon a hardware device, which when executed by one or more processors, causes:
   initiating a change in an operational state of a virtual machine operating on the hardware device from a suspended operational state to a state where the virtual machine is stored in memory; and
   aborting the change in operational state of the virtual machine upon determining that the user no longer desires to interact with the virtual machine prior to the change in operational state being completed.

\* \* \* \* \*